US012284730B2

(12) United States Patent
Kim et al.

(10) Patent No.: US 12,284,730 B2
(45) Date of Patent: Apr. 22, 2025

(54) SERIAL-TYPE PLANAR HEAT-GENERATING HEATER AND MANUFACTURING METHOD THEREFOR

(71) Applicant: TERAON CO., LTD., Seongnam-si (KR)

(72) Inventors: Yoon Jin Kim, Yongin-si (KR); Sang Hyun Jang, Yongin-si (KR); Hyung Jun Kim, Seoul (KR)

(73) Assignee: TERAON CO., LTD., Seongnam-si (KR)

( * ) Notice: Subject to any disclaimer, the term of this patent is extended or adjusted under 35 U.S.C. 154(b) by 855 days.

(21) Appl. No.: 17/605,222

(22) PCT Filed: Apr. 20, 2020

(86) PCT No.: PCT/KR2020/005227
§ 371 (c)(1),
(2) Date: Oct. 20, 2021

(87) PCT Pub. No.: WO2020/256267
PCT Pub. Date: Dec. 24, 2020

(65) Prior Publication Data
US 2022/0217818 A1 Jul. 7, 2022

(30) Foreign Application Priority Data
Jun. 17, 2019 (KR) ........................ 10-2019-0071333
Jul. 25, 2019 (KR) ........................ 10-2019-0090158

(51) Int. Cl.
*H05B 3/26* (2006.01)

(52) U.S. Cl.
CPC ..................................... *H05B 3/26* (2013.01)

(58) Field of Classification Search
CPC ............ H01L 21/324; H01L 21/67098; H01L 21/67103; H01L 21/67248; H01L 21/6831;
(Continued)

(56) References Cited

U.S. PATENT DOCUMENTS

2017/0013676 A1* 1/2017 Aritaki .................... H05B 3/03

FOREIGN PATENT DOCUMENTS

JP 2014-003000 A 1/2014
JP 2017-017016 A 1/2017
(Continued)

OTHER PUBLICATIONS

Kim, KR 20170118993 (Year: 2017).*
(Continued)

*Primary Examiner* — Vy T Nugyen
(74) *Attorney, Agent, or Firm* — Park, Kim & Suh, LLC

(57) ABSTRACT

Provided is a serial-type planar heat-generating heater and a manufacturing method thereof. In particular, the present invention relates to a serial-type planar heat-generating heater, which is capable of maximizing the effect of heating by minimizing dead zones in which heat is not generated, achieving a maximum power output in a limited area, unlike in a parallel-type heater, and achieving high temperature uniformity in all of heat-generating surfaces of the planar heat-generating heater, is easy to design to control heating performance, and may be manufactured at low costs; and a manufacturing method thereof.

10 Claims, 16 Drawing Sheets

(58) Field of Classification Search
CPC ............ H01L 21/6833; H01M 10/615; H01M 10/625; H01M 10/63; H01M 10/6571; H01M 10/667; H05B 1/0241; H05B 2203/004; H05B 2203/005; H05B 2203/007; H05B 2203/011; H05B 3/03; H05B 3/143; H05B 3/265; H05B 3/283
USPC ................ 29/623.4, 623.5; 429/144; 156/60; 219/451.1
See application file for complete search history.

(56) References Cited

FOREIGN PATENT DOCUMENTS

| | | | |
|---|---|---|---|
| KR | 10-2000-0062492 | A | 10/2000 |
| KR | 10-2016-0124668 | A | 10/2016 |
| KR | 10-2017-0118993 | A | 10/2017 |

OTHER PUBLICATIONS

Kim736, WO 2012169736 (Year: 2012).*
International Search Report in International Application No. PCT/KR2020/005227, dated Aug. 6, 2020, 2pages.

* cited by examiner

SERIAL-TYPE PLANAR HEAT-GENERATING HEATER AND MANUFACTURING METHOD THEREFOR

CROSS-REFERENCE TO RELATED APPLICATIONS

This application is the National Stage filing under 35 U.S.C. 371 of International Application No. PCT/KR2020/005227, filed on Apr. 20, 2020, which claims the benefit of Korean Patent Application No. 10-2019-0071333, filed on Jun. 17, 2019, and Korean Patent Application No. 10-2019-0090158, filed on Jul. 25, 2019, the contents of which are all hereby incorporated by reference herein in their entirety.

TECHNICAL FIELD

The present invention relates to a serial-type planar heat-generating heater and a manufacturing method thereof. In particular, the present invention relates to a serial-type planar heat-generating heater, which is capable of maximizing the effect of heating by minimizing dead zones in which heat is not generated, achieving a maximum power output in a limited area, unlike in a parallel-type heater, and achieving high temperature uniformity in all of heat-generating surfaces of the planar heat-generating heater, is easy to design to control heating performance, and may be manufactured at low costs; and a manufacturing method thereof.

BACKGROUND ART

A planar heat-generating heater is a compact heater in which electrodes, heating elements, etc. are printed on a planar support plate, and is applicable to a variety of applications, including electric and electronic equipment required to be smaller and lighter, e.g., a printer, a photocopier, a heating device, an oven, a cooker, etc.

FIG. 1 schematically illustrates an example of a planar heat-generating heater of the related art. FIG. 2 is a schematic cross-sectional view taken along line A-A' of FIG. 1.

As shown in FIGS. 1 and 2, the planar heat-generating heater of the related art includes an electrode 20 provided on a surface of an insulating substrate and including a pair of electrode patterns 21 and 22 having different polarities and electrically disconnected from each other, and a plurality of heating elements 30 connected in parallel and each having both ends connected to the pair of electrode patterns 21 and 22.

Because in the planar heat-generating heater of the related art, the plurality of heating elements 30 are connected in parallel to each other, the electrode patterns 21 and 22 having different polarities should be respectively connected to both ends of each of the heating elements 30, and thus, the design of the electrode patterns 21 and 22 is evitably complicated as the number of heating elements 30 increases. Accordingly, in the planar heat-generating heater, the number of dead zones in which no heating element is disposed and heat is not generated increases and thus the effect of heating decreases.

Heat transfer occurs due to conduction between the heating element 30 and the insulating substrate 10 when the heating element 30 and the insulating substrate 10 are in contact with each other. The heating element 30 is a conductor through which electric current may flow and is formed of a material having relatively high thermal conductivity, whereas the insulating substrate 10 is a nonconductor through which electric current does not flow and is formed of a material having relatively low thermal conductivity. Accordingly, due to the difference in thermal conductivity between the heating element 30 and the insulating substrate 10, temperature non-uniformity may occur in all heat-generating surfaces of the planar heat-generating heater and thus heat should be diffused to a heat-generating surface that does not generate heat, thereby causing an energy loss.

Therefore, there is an urgent need for a planar heat-generating heater which is capable of maximizing the effect of heating by minimizing dead zones in which heat is not generated, is capable of achieving high temperature uniformity in all of heat-generating surfaces of the planar heat-generating heater, is easy to design to control heating performance, and is manufactured at low costs; and a manufacturing method thereof.

DISCLOSURE

Technical Problem

The present invention is directed to providing a serial type planar heat-generating heater capable of maximizing the effect of heating by minimizing dead zones in which heat is not generated and achieving high temperature uniformity in all of heat-generating surfaces thereof, and a manufacturing method thereof.

The present invention is also directed to providing a serial type planar heat-generating heater that is easy to design to control heating performance and a manufacturing method thereof.

Technical Solution

According to an aspect of the present invention, provided is a serial type planar heat-generating heater comprising a base substrate, an electrode plate, an insulating film, and a heating layer that are sequentially stacked from bottom to top, wherein the electrode plate comprises a plurality of electrodes spaced apart from each other, a plurality of perforated lines are formed in the insulating film to extend to surfaces of the plurality of electrodes, the heating layer comprises a plurality of heating elements spaced apart from each other, and both ends of each of the plurality of heating elements are respectively connected to a pair of adjacent electrodes through the perforated lines, thereby connecting all of the plurality of heating elements in series to each other.

According to another aspect of the present invention, provided is the serial type planar heat-generating heater, wherein the perforated lines are formed such that widths thereof that are in parallel to a direction in which current flows through the heating elements are the same with respect to all of certain points on each of the heating elements.

According to other aspect of the present invention, provided is the serial type planar heat-generating heater, wherein the plurality of electrodes and the plurality of heating elements are arranged in rows or columns, and the plurality of electrodes comprise an electrode located at one end of adjacent rows or columns and having a shape includable in both the adjacent rows or columns.

According to other aspect of the present invention, provided is the serial type planar heat-generating heater, wherein a protective film is stacked on the heating layer.

According to other aspect of the present invention, provided is the serial type planar heat-generating heater, further comprising a lower electrode plate below the base substrate, and a lower substrate stacked below the lower electrode plate, wherein the base substrate comprises a via hole filled with a conductive material, an electrode located at an end among the plurality of electrodes electrically connected through the heating elements is connected to the lower electrode plate through the via hole, and the lower electrode plate comprises a protruding electrode located adjacent to an electrode located at another end among the plurality of electrodes.

According to other aspect of the present invention, provided is the serial type planar heat-generating heater, wherein the base substrate comprises a plurality of via holes filled with a conductive material, a pair of electrode located at opposite ends among the plurality of electrodes electrically connected through the heating elements are connected to the lower electrode plate through the via holes, and the lower electrode plate comprises a pair of protruding electrodes respectively connected to the pair of electrodes located at the opposite ends, disposed apart from each other, and electrically disconnected from each other by a separation line.

According to other aspect of the present invention, provided is the serial type planar heat-generating heater, wherein the electrode is formed of a metal having a specific resistance of $2.82\times10^{-6}$ Ω·cm or less, a heat resistance of 260° C. or more, and thermal conductivity of 12 W/m·K.

According to other aspect of the present invention, provided is the serial type planar heat-generating heater, wherein the insulating film comprises an insulating film containing at least one polymer resin selected from the group consisting of polyimide (PI), polyphenylene sulfide (PPS), a liquid crystal polymer (LCP), polyethyelene sulfide (PES), polyethyelene imide (PEI), polyether ether ketone (PEEK), polyamide-imide (PAI), and polysulfone (PSU).

According to other aspect of the present invention, provided is the serial type planar heat-generating heater, wherein the heating elements are formed of a heating element composition containing a mixed binder and conductive particles, wherein the conductive particles comprise at least one of metal particles and carbon particles.

According to another aspect of the present invention, provided is a manufacturing method of the serial type planar heat-generating heater, comprising: a) forming a plurality of electrodes to be spaced apart from each other by forming a plurality of gaps on the electrode plate stacked on the base substrate; b) laminating an insulating film with a plurality of perforated lines on the electrode plate; c) connecting a pair of perforated lines located on surfaces of a pair of adjacent electrodes among the plurality of perforated lines to print a plurality of heating elements spaced apart from each other and having both ends respectively connected to the pair of electrodes, and d) laminating a protective film on the heating elements, wherein operations a) to d) are performed sequentially.

According to another aspect of the present invention, provided is a serial and curved type planar heat-generating heater in which at least some edges are curved, comprising a base substrate, an upper electrode plate including a plurality of electrodes spaced apart from each other, an insulating film including a plurality of perforated holes extending to surfaces of the plurality of electrodes, and a heating layer including a plurality of heating elements spaced apart from each other, which are sequentially stacked from bottom to top, wherein at least one serial connection section is provided in which both ends of each of the plurality of heating elements are respectively connected to a pair of adjacent electrodes through the perforated holes, thereby connecting all of the plurality of heating elements in series to each other, a surface of each of an electrode and a heating element arranged adjacent to a curved edge of the serial and curved type planar heat-generating heater among the electrodes and the heating elements has a curved portion corresponding to the curved edge, the surface being located adjacent to the curved edge, and opposite inner sides of two adjacent perforated holes among the plurality of perforated holes are designed to be parallel to each other.

According to other aspect of the present invention, provided is the serial and curved type planar heat-generating heater, wherein, when current flows through a heating element having both ends respectively connected to a pair of adjacent electrodes through the two adjacent perforated holes, resistances at certain points are controlled to be the same.

According to other aspect of the present invention, provided is the serial and curved type planar heat-generating heater, wherein a plurality of electrodes and at least one heating element arranged in the at least one serial connection section each have a curved trapezoidal shape having an upper side longer than a lower side, wherein the upper side and the lower side have a curved shape corresponding to the curved edge and are parallel to each other.

According to other aspect of the present invention, provided is the serial and curved type planar heat-generating heater, wherein a lower electrode plate is stacked below the base substrate, a lower protective film is stacked below the lower electrode plate, a via hole is formed on the base substrate, the via hole being filled with a conductive material, a pair of electrodes located at opposite ends according to a flow of current among the electrodes arranged in the at least one serial connection section are respectively connected to a pair of connection surfaces of the lower electrode plate through the via hole, the lower electrode plate comprises a pair of protruding electrodes electrically disconnected from each other by a separation line and arranged adjacent to each other, and the pair of connection surfaces are respectively electrically connected to the pair of protruding electrodes.

According to other aspect of the present invention, provided is the serial and curved type planar heat-generating heater, wherein a plurality of electrodes arranged in the at least one serial connection section are capable of being at least partially arranged in rows or columns, and at least one electrode has a shape includable in adjacent rows or columns to electrically connect electrodes arranged in the rows and columns.

According to other aspect of the present invention, provided is the serial and curved type planar heat-generating heater, wherein the at least one serial connection section comprises a plurality of serial connection sections, a pair of semicircular electrodes are arranged in a center region of an innermost serial connection section among the plurality of serial connection sections, wherein the pair of semicircular electrodes are disposed apart from each other and the electrodes are not permitted to be arranged in the center region, and the pair of semicircular electrodes disposed apart from each other are electrically connectable to each other through a heating element stacked thereon.

According to other aspect of the present invention, provided is the serial and curved type planar heat-generating heater, further comprising an upper protective film stacked on the heating layer.

According to other aspect of the present invention, provided is the serial and curved type planar heat-generating heater, wherein the electrode is formed of a metal having a specific resistance of $1.72\times10^{-6}$ Ω·cm or more, a heat resistance of 260° C. or more, and thermal conductivity of 12 W/m·K.

According to other aspect of the present invention, provided is the serial and curved type planar heat-generating heater, wherein the insulating film comprises an insulating film containing at least one polymer resin selected from the group consisting of polyimide (PI), polyphenylene sulfide (PPS), a liquid crystal polymer (LCP), polyethyelene sulfide (PES), polyethyelene imide (PEI), polyether ether ketone (PEEK), polyamide-imide (PAI), and polysulfone (PSU).

According to other aspect of the present invention, provided is the serial and curved type planar heat-generating heater, wherein the heating elements are formed of a heating element composition containing a mixed binder and conductive particles, wherein the conductive particles comprise at least one of metal particles and carbon particles.

According to another aspect of the present invention, provided is a manufacturing method of the serial and curved type planar heat-generating heater, comprising: a) forming a pair of protruding electrodes to be electrically disconnected from each other by forming a separation line with respect to a lower electrode plate stacked on a lower protective film; b) laminating a base substrate including a via hole filled with a conductive material on the lower electrode plate; c) forming a plurality of electrodes to be spaced apart from each other by forming a plurality of gaps with respect to an upper electrode plate, and laminating the plurality of electrodes on the base substrate; d) laminating an insulating film with a plurality of perforated holes on the upper electrode plate; e) connecting a pair of perforated holes located on surfaces of a pair of adjacent electrodes among the plurality of perforated holes to print a plurality of heating elements spaced apart from each other and having both ends respectively connected to the pair of electrodes, and f) laminating an upper protective film on the heating layer including the heating elements, wherein operations a) to f) are performed sequentially.

Advantageous Effects

In a serial type planar heat-generating heater according to the present invention, a plurality of heating elements are connected in series to minimize dead zones in which no heating element is disposed and thus heat is not generated, and high temperature uniformity can be achieved in all of heat-generating surfaces of the planar heat-generating heater by covering the heat-generating surfaces with electrodes configured to apply a voltage to the heating elements and formed of a metal having high thermal conductivity.

In addition, the serial type planar heat-generating heater according to the present invention is easy to design to control heating performance, because heating performance can be controlled by adjusting perforation positions on an insulating film applied to electrodes rather than the distance between a pair of electrodes.

MODE FOR INVENTION

Hereinafter, embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those of ordinary skill in the art. Throughout the specification, the same reference numbers represent the same elements.

Figure 1:
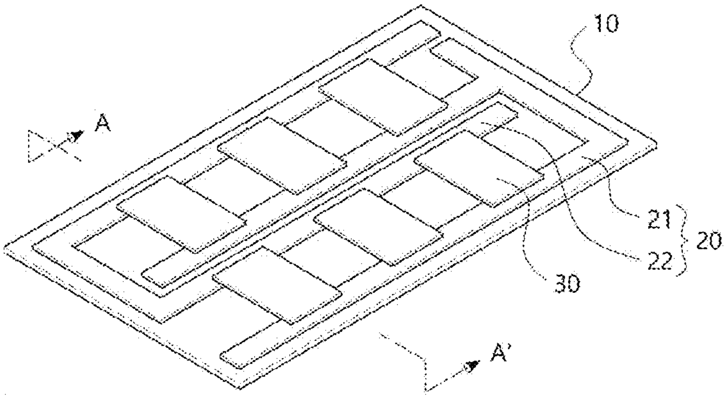
FIG. 1 schematically illustrate a structure of a planar heat-generating heater of the related art.
Figure 2:
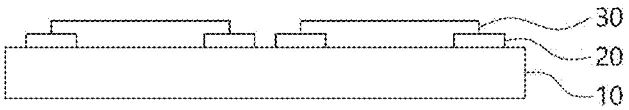
FIG. 2 is a schematic cross-sectional view taken along line A-A' of FIG. 1.
Figure 3:
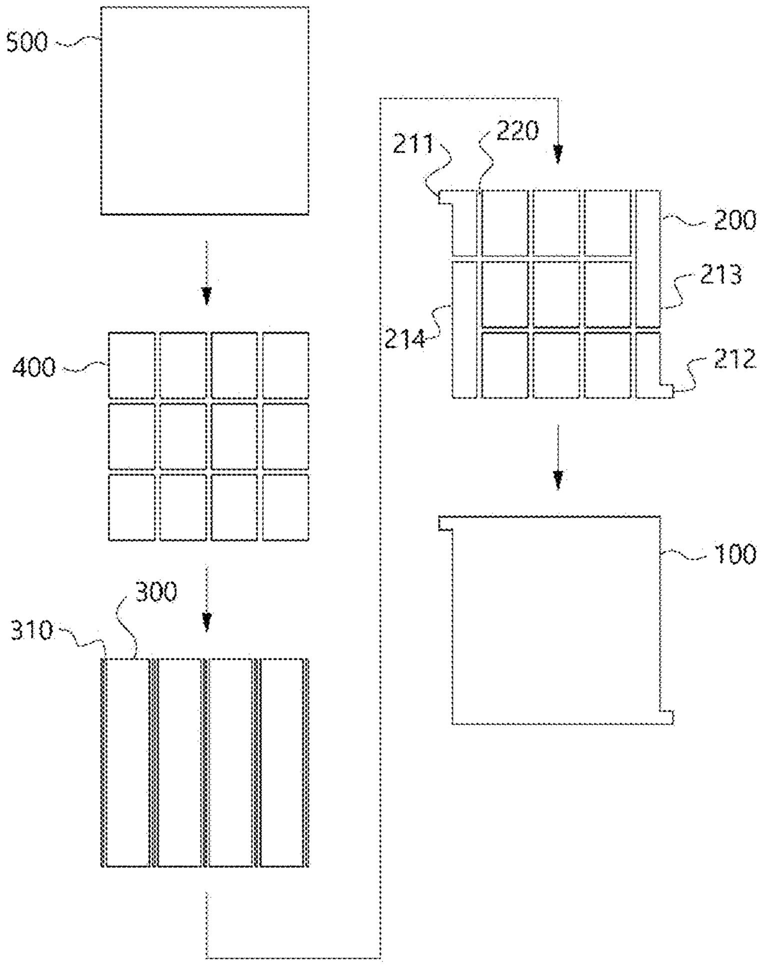
FIG. 3 schematically illustrates layers of a stacked structure of a serial type planar heat-generating heater according to an embodiment of the present invention.
Figure 4:
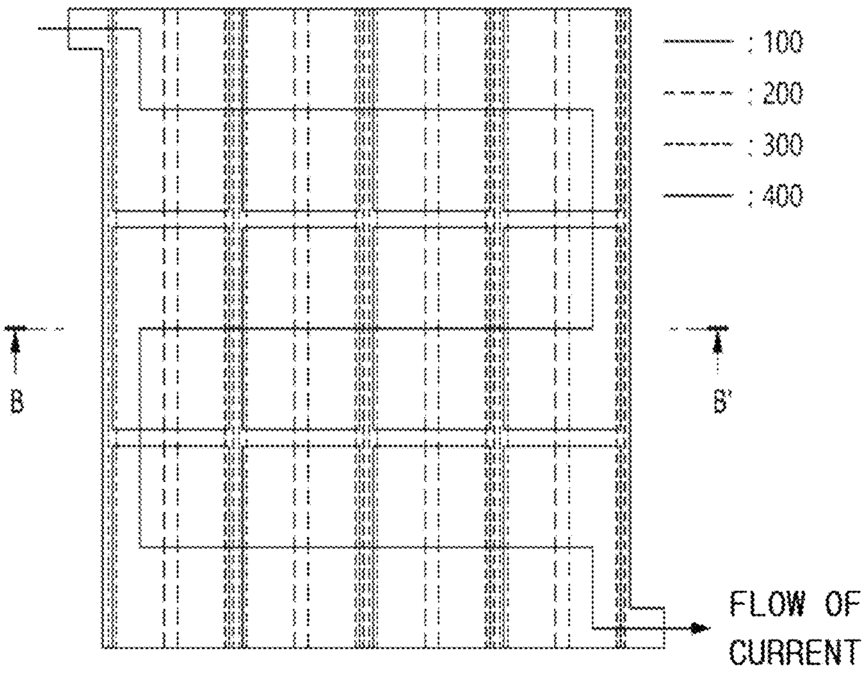
FIG. 4 is a schematic perspective view of a serial type planar heat-generating heater in which the layers of FIG. 3 are sequentially stacked.
Figure 5:
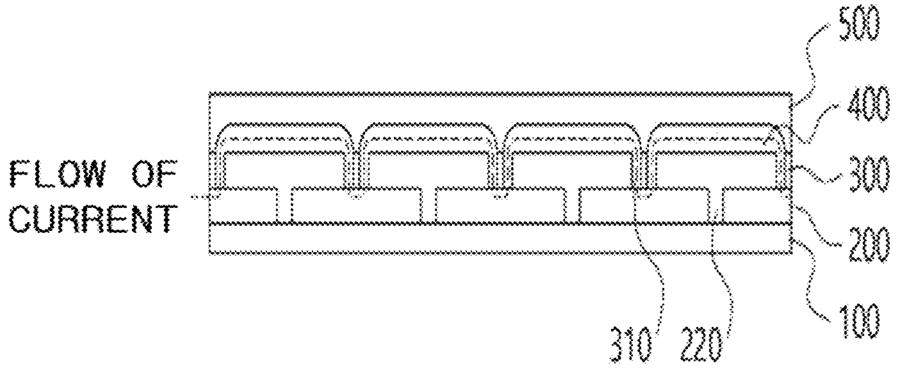
FIG. 5 is a schematic cross-sectional view taken along line B-B' of FIG. 4.

FIG. 3 schematically illustrates layers of a stacked structure of a serial type planar heat-generating heater according to an embodiment of the present invention. FIG. 4 is a schematic perspective view of a serial type planar heat-generating heater in which the layers of FIG. 3 are sequentially stacked. FIG. 5 is a schematic cross-sectional view taken along line B-B' of FIG. 4.

As shown in FIGS. 3 to 5, the serial type planar heat-generating heater according to the present invention may be formed by sequentially stacking a base substrate 100, an electrode plate 200, an insulating film 300, a heating layer 400, and a protective film 500 from bottom to top.

Here, the base substrate 100 may have a shape corresponding to a shape of the electrode plate 200 stacked thereon and a thickness of about 15 to 100 m.

The base substrate 100 may be formed of at least one plastic material selected from the group consisting polyethyelene terephthalate (PET), polyimide (PI), poly acrylonitrile (PAN), polyurethane (PU), silicon, polycarbonate (PC), Teflon, liquid crystal polymer (LCP), polyether ether ketone (PEEK), polyether sulfone (PES), polyacrylate (PAR), polyetherimide (PEI), polyethylene naphthalate (PEN), polyphenylene sulfide (PPS), polyallylate, cellulose triacetate (CTA), cellulose acetate propionate (CAP), etc., according to an application field to which the serial type planar heat-generating heater of the present invention is applicable or a usage temperature thereof.

The electrode plate 200 may include a plurality of electrodes 210 formed by etching using photolithography or the like to be spaced a gap 220 of about 0.05 to 10 mm apart from each other in a width direction, and the plurality of electrodes 10 spaced apart from each other not to be electrically connected are electrically connected through a plurality of heating elements 410 included in the heating layer 400.

Specifically, as shown in FIG. 5, a plurality of perforated lines 310 are formed on the insulating film 300, which is stacked on the electrode plate 200, to extend to surfaces of the electrodes 210 of the electrode plate 200 by etching sing a laser device or the like, and both ends of each of the heating elements 410 included in the heating layer 400 are respectively connected to a pair of adjacent electrodes 210 through the perforated lines 310, thereby electrically connecting all of the plurality of electrodes 210.

Furthermore, the plurality of electrodes 210 included in the electrode plate 200 may be arranged in rows and columns, and electrodes 213 and 214 located at the ends of adjacent rows or columns in one direction may have a shape that may be included in both the adjacent rows or columns, thereby electrically connecting all of the plurality of electrodes 210 even when arranged in rows or columns.

Thus, all of the plurality of heating elements 410 are connected in series and current flows therethrough according to the "flow of current" shown in FIGS. 4 and 5, when a pair of electrodes 211 and 212 located at opposite ends among the plurality of electrodes 210 electrically connected through the plurality of heating elements 410 have different polarities and a voltage is applied thereto.

Here, the electrodes 210 may be formed of a metal such as aluminum, steel, or copper, and the metal may have specific gravity or 2.7 g/cm$^3$ or more, e.g., 2.7 to 8.9 g/cm$^3$, a specific resistance of $2.82\times10^{-6}$ Ω·cm or less, e.g., $1.72\times10^{-6}$ to $2.82\times10^{-6}$ Ω·cm, a heat resistance of 260° C. or more, e.g., 260 to 500° C., and thermal conductivity of 12 W/m·K or more, e.g., 12 to 400 W/m·K. A total size of the electrode plate 200 may vary according to usage of the serial type planar heat-generating heater according to the present invention.

The insulating film 300 stacked on the electrode plate 200 may be provided with a plurality of perforated lines 310 extending to the surfaces of the electrode plate 200, and a width of heating elements 410 each having ends connected to a pair of adjacent electrodes 210 through a pair of perforated lines 310 connected to surfaces of the pair of adjacent electrode plates 210 among the plurality of perforated lines 310 is determined by the length of a gap between the pair of perforated lines 310, thereby controlling heating performance by adjusting the length of the gap between the pair of perforated lines 310.

In particular, the pair of perforated lines 310 may be formed such that widths of the heating elements 410 having both ends inserted into the pair of perforated lines 310, which are parallel to a direction of current, are the same at all of positions. Accordingly, the heating elements 410 may have the same resistance in all current flow directions and thus the amount of generated heat may be uniform, thereby achieving temperature uniformity.

The insulating film 300 may include a polymer resin film having high insulating and heat-resistance properties, and preferably, a film containing a polymer resin, e.g., polyimide (PI), polyphenylene sulfide (PPS), a liquid crystal polymer (LCP), polyethyelene sulfide (PES), polyethylene imide (PEI), polyether ether ketone (PEEK), polyamide-imide (PAI), or polysulfone (PSU), which has long-term thermal stability at 230° C. or more and short-term thermal stability at 400° C. or more, exhibits high strength, elasticity and rigidity even at heat deflection temperature (HDT/A) of 470° C. or more or temperature of 230° C. or more, exhibits high purity and emits low-temperature gases in a vacuum state, and has high processability and flame retardancy.

The heating layer 400 may include the plurality of heating elements 410 spaced apart from each other, the plurality of heating elements 410 may be arranged in rows and columns, similar to the plurality of electrodes 210 included in the electrode plate 200, and both ends of each of the plurality of heating elements 410 are respectively connected to a pair of electrodes 210 spaced apart from each other of the electrode plate 200 through the perforated lines 310 of the insulating film 300 as described above.

The heating elements 410 may be formed by printing and drying a heating-element composition containing a mixed binder and conductive particles, and may have a thickness of about 1 to 20 m.

The mixed binder may contain two or more materials selected from the group consisting of a phenol-based resin, an acetal resin, a isocyanate resin, an epoxy resin, etc. to have heat resistance even at a temperature of about 300° C., and the conductive particles may contain carbon particles to improve the heat resistance of the heating elements 410 and additionally contain metal powder.

The carbon particles may include carbon black, carbon nanotubes, graphite, activate carbon, or the like, and preferably, carbon nanotubes and graphite, carbon nanotubes, which are carbon particles, have a large aspect ratio and may form a sufficient electrical network when a small amount thereof is used and increase glass transition temperature and heat resistance of the heating element composition, and graphite may allow to achieve low resistance that cannot be achieved using carbon nanotubes.

The protective film 500 may be additionally stacked on the heating layer 400 to protect the heating layer 400 from the outside and have a shape corresponding to a whole shape of the heating layer 400 and a thickness of about 15 to 100 m. The protective film 500 may be formed of a material that is the same as or different from that of the insulating film 300, and preferably, the same material.

The serial type planar heat-generating heater according to the present invention may be manufactured by sequentially performing the following operations (a) to (d):

a) forming the plurality of electrodes 210 to be spaced apart from each other by forming a plurality of gaps by etching the electrode plate 200 stacked on the base substrate 100 by photolithography or the like, b) laminating, on the electrode plate 200, an insulating film with the plurality of perforated lines 310 formed by etching performed by a laser device or the like, c) connecting a pair of perforated lines 310 provided on surfaces of a pair of adjacent electrodes 210 among the plurality of perforated lines 310 to print a plurality of heating elements having both ends respectively connected to the pair of electrodes 210 and spaced apart from each other, and d) laminating a protective film on the heating elements.

In the serial type planar heat-generating heater of the present invention, dead zones may be minimized owing to the above-described structure, and particularly, a structure in which the insulating film 300 is stacked on the electrode plate 200 including the plurality of electrodes 210 spaced apart from each other and the plurality of electrodes 210 are electrically connected through the plurality of heating elements 410 each having both ends connected to a pair of adjacent electrodes 210 through the plurality of perforated lines 310 on the insulating film 300, thereby connecting the plurality of heating elements 410 in series, unlike in the related art in which a plurality of heating elements are connected in parallel and design of an electrode pattern for connecting electrodes having different polarities to both ends of each heating element is complicated, thus increasing dead zones in which a heating element is not disposed on heat-generating surfaces and thus heat is not generated; and high temperature uniformity may be achieved through rapid heat transfer in all of heat-generating surfaces of the planar heat-generating heater by covering all of the heat-generating surfaces of the planar heat-generating heater with electrodes formed of a metal having high thermal conductivity.

Furthermore, as described above, in the serial type planar heat-generating heater, heating performance is controllable by designing the perforated lines 310 on the insulating film 300 stacked on the electrode plate 200 rather than designing the electrode plate 200 and thus design for control of heating performance may be easier than that of a planar heat-generating heater of the related art in which design of an electrode plate should be changed according to heating performance.

Figure 6:
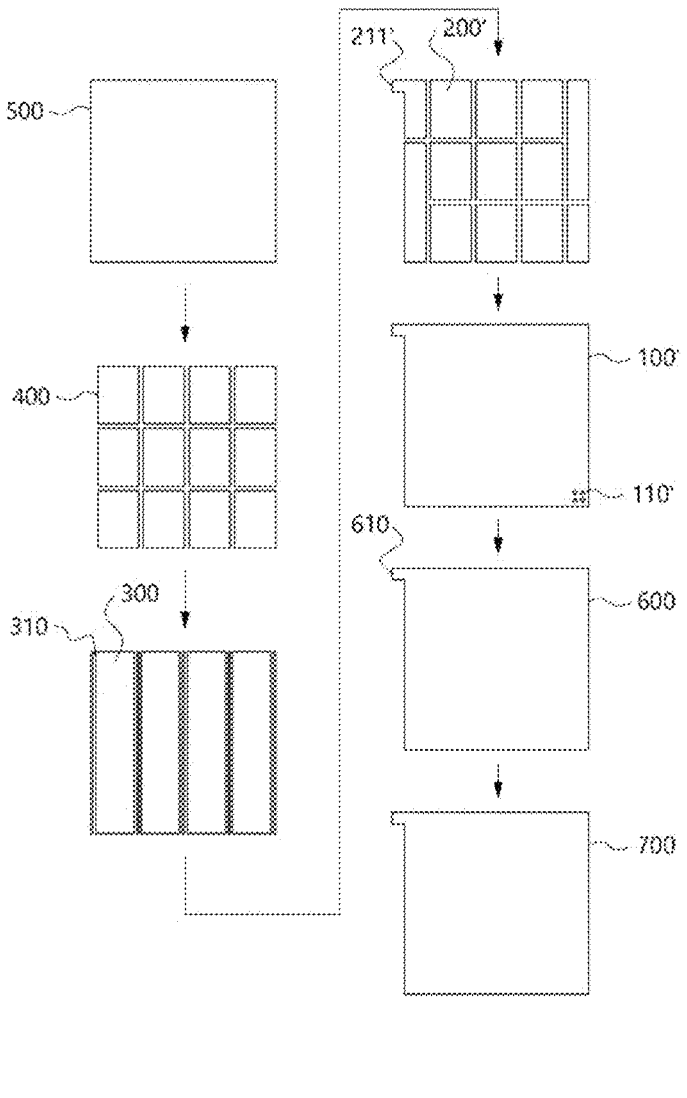
FIG. 6 schematically illustrates layers of the serial type planar heat-generating heater of FIG. 3 according to another embodiment of the present invention.

FIG. 6 schematically illustrates layers of the serial type planar heat-generating heater of FIG. 3 according to another embodiment of the present invention.

As shown in FIG. 6, a lower electrode plate 600 may be additionally provided below a base substrate 100', and a lower substrate 700 may be stacked below the lower electrode plate 600. The lower substrate 700 may support and insulate the lower electrode plate 600, have a shape corresponding to a whole shape of the lower electrode plate 600, and be formed to the same thickness and of the same material as the base substrate 100 described above.

The lower electrode plate 600 is connected to an electrode 212' located at an end among a plurality of electrodes 210', which are spaced apart from each other on an electrode plate 200' and electrically connected through a plurality of heating elements 410, through a via hole 110' formed in the base substrate 100' stacked on the lower electrode plate 600 and filled with a conductive material.

An electrode 610 may protrude from a position on the lower electrode plate 600 adjacent to, for example, below an electrode 210' located at another end among the plurality of electrodes 210' of the electrode plate 200' that are electrically connected to each other, and have different polarity from that of the electrode 211', and therefore, a pair of the electrodes 211' and 610 having different polarities may be located adjacent to each other and an arrangement of terminals connected thereto may be easily designed.

Figure 7:
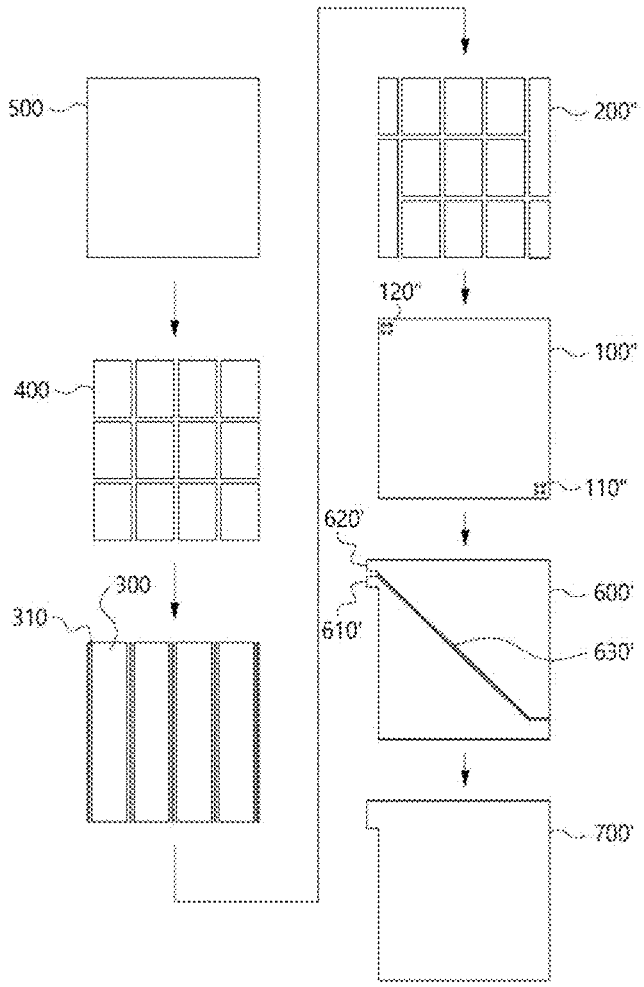
FIG. 7 schematically illustrates layers of the serial type planar heat-generating heater of FIG. 3 according to another embodiment of the present invention.

FIG. 7 schematically illustrates layers of the serial type planar heat-generating heater of FIG. 3 according to another embodiment of the present invention.

As shown in FIG. 7, a lower electrode plate 600' may be additionally provided below a base substrate 100", and a lower substrate 700' may be stacked below the lower electrode plate 600'. The lower substrate 700' may support and insulate the lower electrode plate 600', have a shape corresponding to a whole shape of the lower electrode plate 600', and be formed to the same thickness and of the same material as the base substrate 100 described above.

The lower electrode plate 600' is connected to electrodes 211" and 212" located at opposite ends among a plurality of electrodes 210", which are spaced apart from each other on an electrode plate 200" and electrically connected through a plurality of heating elements 410, through via holes 110" and 120" formed in the base substrate 100" stacked on the lower electrode plate 600' and filled with a conductive material.

A pair of electrodes 610' and 620' may protrude from the lower electrode plate 600' to be connected to the electrodes 211" and 212", which are located at opposite ends, through the via holes 110" and 120" of the base substrate 100", and may be electrically disconnected from each other by a separation line 630'.

Therefore, the pair of electrodes 610' and 620' having different polarities may be located adjacent to each other and an arrangement of terminals connected thereto may be easily designed.

Figure 8:
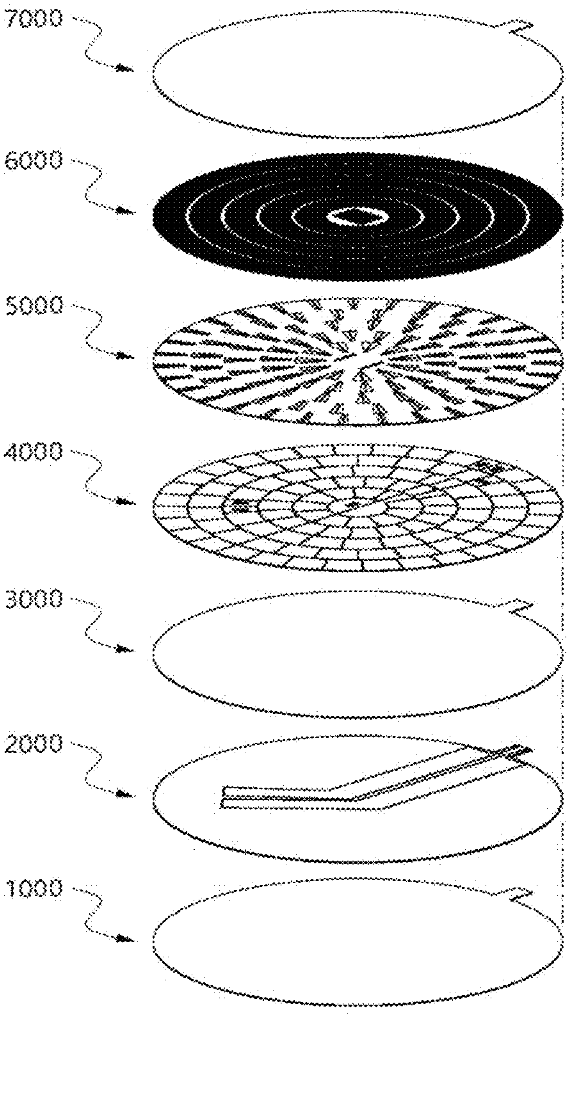
FIG. 8 is a schematic exploded perspective view of a stacked structure of a serial and curved type planar heat-generating heater according to an embodiment of the present invention.
Figure 9:
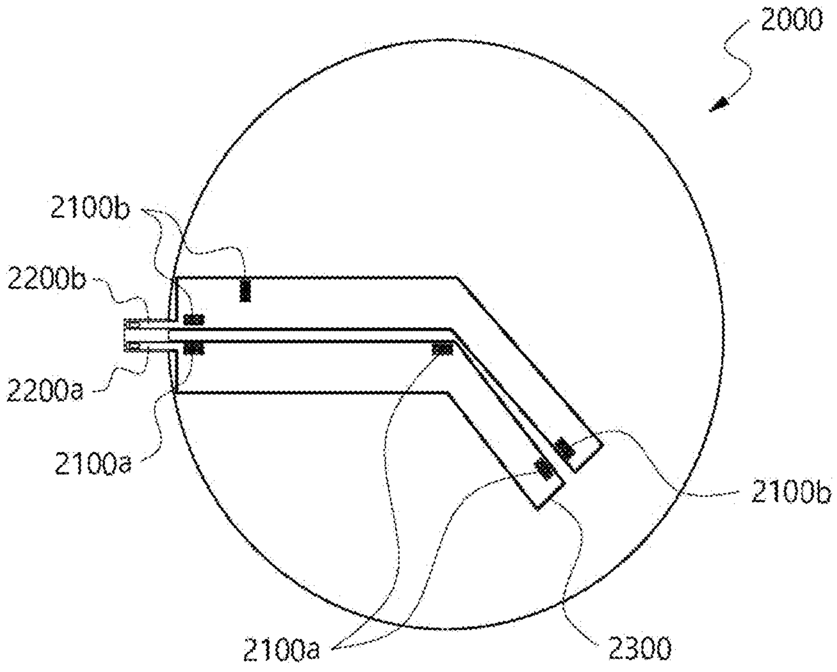
FIG. 9 is a plan view of a lower electrode plate of FIG. 8.
Figure 10:
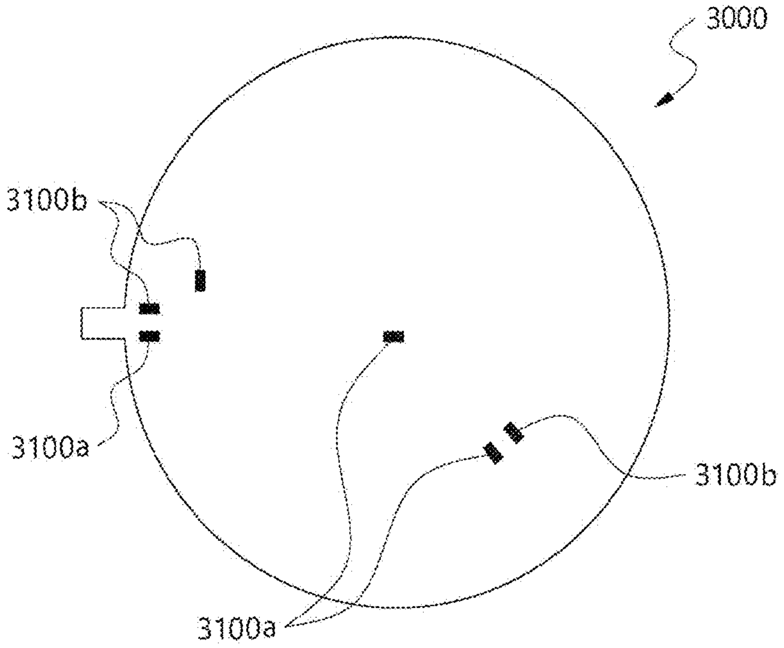
FIG. 10 is a plan view of a base substrate of FIG. 8.

FIG. 8 is a schematic exploded perspective view of a stacked structure of a serial and curved type planar heat-generating heater according to an embodiment of the present invention. FIGS. 9 to 13 are plan views of a lower electrode plate, a base substrate, an upper electrode plate, an insulating film, and a heating layer.

As shown in FIG. 8, the serial and curved type planar heat-generating heater of the present invention may be formed by sequentially stacking a lower protective film 1000, a lower electrode plate 2000, a base substrate 3000, an upper electrode plate 4000, an insulating film 5000, a heating layer 6000, and an upper protective film 7000 from bottom to top.

Each of these stacked elements may have the same or similar planar shape, and particularly, at least a portion of an edge of each of them may be curved. For example, a radius of curvature of the curved portion of each edge may be about 1 m or less, and a ratio of a length of the curved portion to a total length of the edge may be about 5% or more.

Here, the lower protective film 1000 may support and insulate the lower electrode plate 2000, and a thickness and a material thereof may vary according to an application field to which the serial and curved type planar heat-generating heater of the present invention is applicable or usage temperature. For example, the thickness may be in a range of about 5 to 20 m, and the material may include at least one plastic material selected from the group consisting of polyethylene terephthalate (PET), polyimide (PI), poly acrylonitrile (PAN), polyurethane (PU), silicon, polycarbonate (PC), Teflon, a liquid crystal polymer (LCP), polyether ether ketone (PEEK), polyether sulfone (PES), polyacrylate (PAR), polyetherimide (PEI), polyethylene naphthalate (PEN), polyphenylene sulfide (PPS), polyallylate, cellulose triacetate (CTA), cellulose acetate propionate (CAP), etc.

The lower electrode plate 2000 includes connection surfaces **2100*a* and 2100*b* respectively connected to electrodes 4100*a* and 4100*b* located at opposite ends among a plurality of electrodes 410 disposed apart from each other on the upper electrode plate 4000 stacked on the base substrate 3000 and connected in series through at least one heating element 6100 through via holes 3100*a* and 3100*b* formed in the base station 3000 stacked on the lower electrode plate 2000** and filled with a conductive material.

In addition, the lower electrode plate 2000 include the pair of protruding electrodes **2200*a* and 2200*b* respectively electrically connected to the pair of connection surfaces 2100*a* and 2100*b* and protruding outward, and the pair of connection surfaces 2100*a* and 2100*b* and the pair of protruding electrodes 2200***a* and 2200*b* may be electrically disconnected from each other through the separation line 2300.

Thus, the pair of protruding electrodes 2200*a* and 2200*b* connected to an external power terminal and having different polarities may be arranged adjacent to each other and an arrangement of the power terminal connected to the pair of protruding electrodes 2200*a* and 2200*b* may be easily designed. However, the lower protective film 1000 and the lower electrode plate 2000 may be omitted according to the design of the arrangement of the power terminal, and in this case, the base substrate 3000 need not be provided with a via hole and the pair of electrodes 4100*a* and 4100*b* of the upper electrode plate may be connected directly to the external power terminal.

The base substrate 3000 may support the upper electrode plate 4000, be disposed between the upper electrode plate 4000 and the lower electrode plate 2000 to insulate the upper electrode plate 4000 and the lower electrode plate 2000 except the via holes 3100*a* and 3100*b*, and be formed to various thicknesses and of various materials according to an application field to which the serial and curved type planar heat-generating heater of the present invention is applicable and usage temperature thereof. For example, the base substrate 3000 may be formed of, for example, the same material as or a material different from that of the lower protective film 1000.

The upper electrode plate 4000 may include a plurality of electrodes 4100 formed by etching using photolithography or the like to be spaced a gap 4200 of about 0.5 to 1 mm apart from each other in a width direction, and particularly include one or more serial connection section in which the plurality of electrodes 4100, which are spaced apart from each other not to be electrically connected, are connected in series through at least one heating element 6100 included in the heating layer 6000. When a plurality of serial connection sections are provided, each of the serial connection sections may have a circular ring shape.

Here, the electrode 4100 and the heating element 6100 disposed in each of the serial connection sections, and particularly, a surface of each of the electrode 4100 and the heating element 6100 adjacent to a curved edge of the serial and curved type planar heat-generating heater of the present invention includes a curved portion corresponding to the curved edge. Thus, even when the electrode 4100 and the heating element 6100 are disposed adjacent to the curved edge, dead zones between the surfaces of the electrode 4100 and the heating element 6100 adjacent to the curved edge and the curved edge, i.e., regions of heat-generating surfaces in which heat is not generated may be minimized, and dead zones between the electrode 4100 and the heating element 6100 disposed adjacent to each other may be also minimized.

In particular, the electrode 4100 and the heating element 6100 have, for example, an inverted trapezoidal shape having an upper side longer than a lower side, and the upper side and the lower side have curved shapes that correspond to the curved edge and are parallel to each other. However, a pair of semicircular electrodes may be disposed apart from each other in a center region of an innermost serial connection section in which the electrode 4100 having a curved trapezoidal shape cannot be disposed among the at least one serial connection section, and may be electrically connected through a tetragonal heating element stacked thereon.

Figure 14:
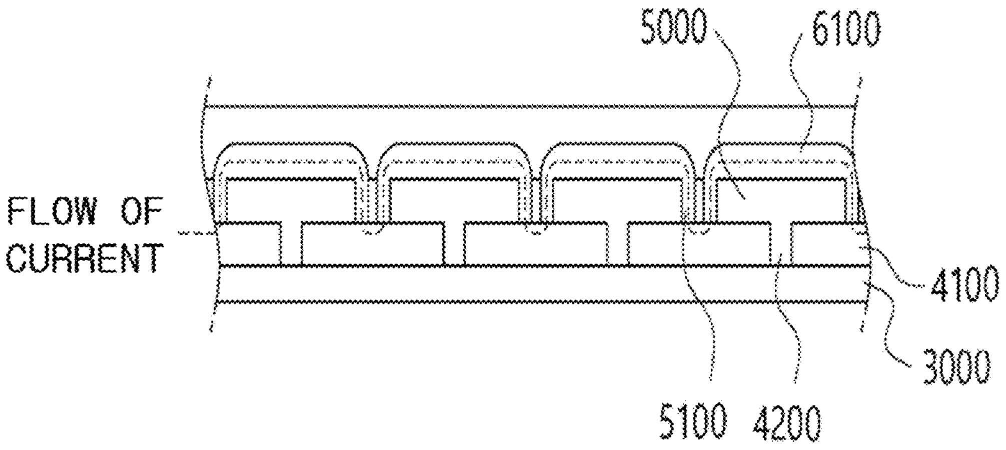
FIG. 14 is a schematic cross-sectional view of a part of the serial and curved type planar heat-generating heater of FIG. 8.

FIG. 14 is a schematic cross-sectional view of a part of the serial and curved type planar heat-generating heater of FIG. 8.

Specifically, as shown in FIG. 14, a plurality of perforated holes 5100 are formed on an insulating film 5000, which is stacked on an upper electrode plate 4000, to extend to surfaces of electrodes 4100 of the upper electrode plate 4000 by etching using a laser device or the like, and both ends of each heating element 6100 included in a heating layer 6000 are respectively connected to a pair of adjacent electrodes 4100 through the perforated holes 5100, thereby electrically connecting all of the plurality of electrodes 4100 disposed in each serial connection section.

Figure 15:
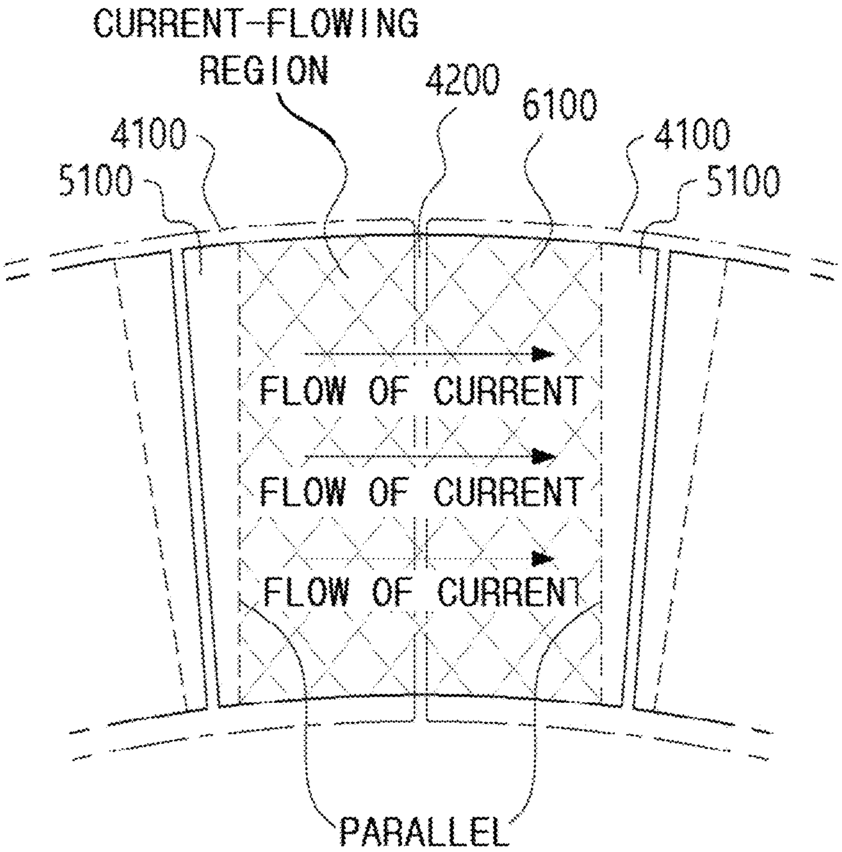
FIG. 15 is a schematic enlarged view of a part of the serial and curved type planar heat-generating heater of FIG. 8.

FIG. 15 is a schematic enlarged view of a part of the serial and curved type planar heat-generating heater of FIG. 8.

As shown in FIG. 15, the heating element 6100 having a curved trapezoidal shape tapers in a current flow direction, i.e., from a lower side to an upper side, wherein the lower and upper sides are curved sides parallel to each other. Accordingly, a resistance of the heating element 6100 increases from the lower side to the upper side and thus temperature non-uniformity may occur in the heating element 6100 due to different resistances when left and right ends of the heating element 6100 are connected to electrodes.

Accordingly, in the serial and curved type planar heat-generating heater of the present invention, the plurality of perforated holes 5100 formed on the insulating film 5000 are designed to have a specific shape such that a resistance at a certain point may be the same when current flows through the heater 6100.

Specifically, as shown in FIG. 15, opposite inner sides of two adjacent perforated holes 5100 among the plurality of perforated holes 5100, i.e., sides thereof in contact with left and right sides of the insulating film 5100 between the two perforated holes, may be designed to be parallel to each other, and thus, in the heating element 6100 connected to the electrodes 4100 below the heating element 6100 through the perforated holes 5100, a region in which a current flow occurs does not taper from bottom to top but may be maintained constant and thus a resistance may be maintained constant, thereby improving temperature uniformity in the heating element 6100.

Figure 11:
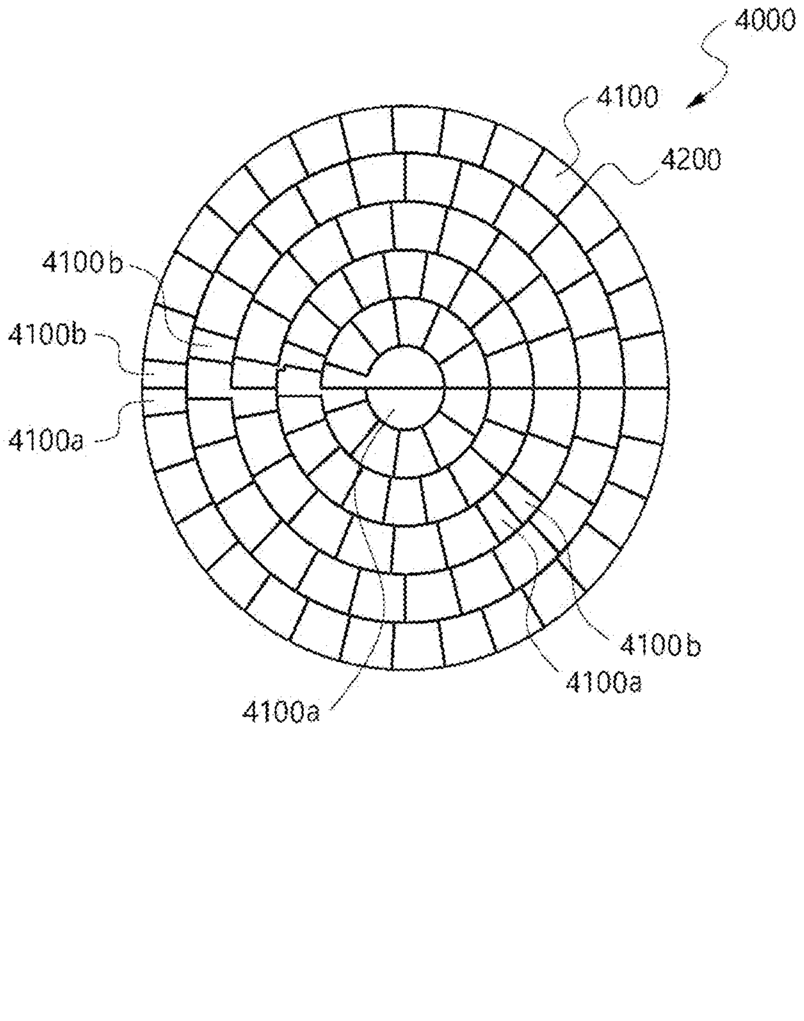
FIG. 11 is a plan view of an upper electrode plate of FIG. 8.
Figure 12:
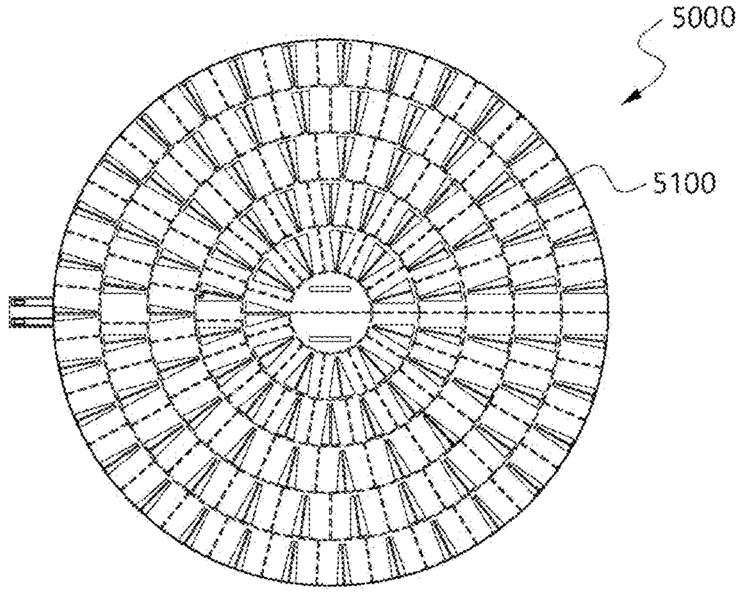
FIG. 12 is a plan view of an insulating film stacked on the upper electrode plate of FIG. 8.
Figure 13:
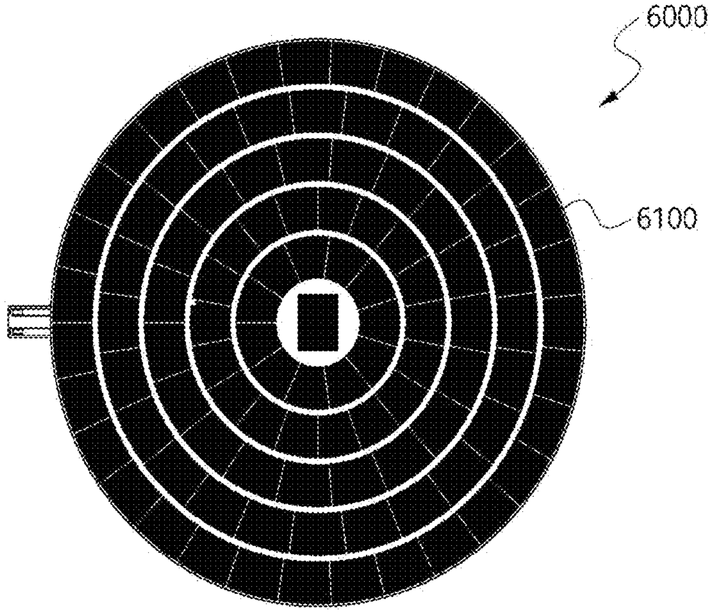
FIG. 13 is a plan view of a heating layer of FIG. 8.
Figure 16:
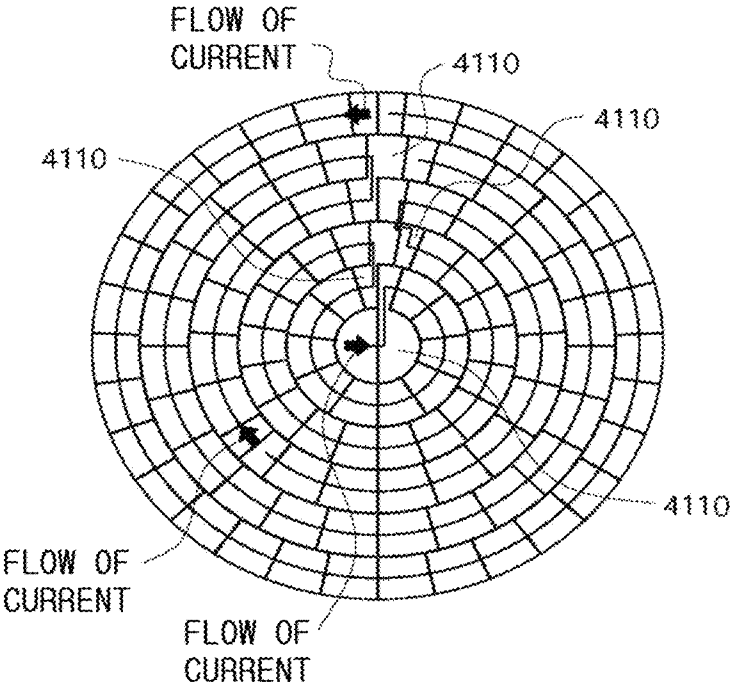
FIG. 16 schematically illustrates a direction in which a current flows through the upper electrode plate of FIG. 8.

FIG. 16 schematically illustrates a direction in which a current flows through the upper electrode plate of FIG. 11.

As shown in FIG. 15, because the upper electrode plate 4100 may include a plurality of serial connection sections, there may be a plurality of serial current flows and a plurality of electrodes 4100 may be at least partially arranged in row or columns in each of the serial connection sections. In this case, some electrodes 4100 may have a shape included in all adjacent rows or columns so that electrodes 4100 in adjacent rows or columns may be electrically connected.

Thus, in each serial connection section, the pair of electrodes 4100*a* and 4100*b* located at opposite ends in the flow of current are respectively connected to the pair of connection surfaces 2100*a* and 2100*b* of the lower electrode plate 2000 through the via holes 3100*a* and 3100*b* of the base substrate 3000, and current flows through heating elements 6100 arranged in in each serial connection section and connected in series when a voltage is applied to a pair of protruding electrodes 2200*a* and 2200*b* electrically connected to the pair of connection surfaces 2100*a* and 2100*b* and having different polarities, thereby generating heat due to a specific resistance of the heating element 6100.

The lower electrode plate 2000 and the upper electrode plate 4000 may be formed of a metal such as aluminum, steel or copper, and the metal may have specific gravity of 2.7 g/cm$^3$ or more, e.g., 2.7 to 8.9 g/cm$^3$, a specific resistance of $2.82\times10^{-6}$ Ω·cm or less, e.g., $1.72\times10^{-6}$ to $2.82\times10^{-6}$≠·cm, a heat resistance of 260° C. or more, e.g., 260 to 500° C., and thermal conductivity of 12 W/m·K or more, e.g., 12 to 400 W/m·K.

For example, the electrode plates 2000 and 4000 may have a thickness of 5 to 75 m. A voltage drop may occur according to a driving voltage when the thicknesses of the electrode plates 2000 and 4000 are less than 5 m, and an error may occur due to a height difference between an electrode part and a heating part when the thicknesses of the electrode plates 2000 and 4000 are greater than 75 m.

The insulating film 5000 may include the plurality of perforated holes 5100 as described above, and a width of the heating elements 6100 each having an end connected to one of a pair of adjacent electrodes 4100 through a pair of adjacent perforated holes 5100 connected to surfaces of the pair of adjacent electrodes 4100 among the plurality of perforated holes 5100 is determined by a length of a gap between the pair of adjacent perforated holes 5100, and therefore, heating performance may be controlled by adjusting the length of the gap between the pair of perforated holes 5100.

The insulating film 5000 may include a polymer resin film having high insulating and heat-resistance properties, and preferably, a film containing a polymer resin, e.g., polyimide (PI), polyphenylene sulfide (PPS), a liquid crystal polymer (LCP), polyethyelene sulfide (PES), polyethyelene imide (PEI), polyether ether ketone (PEEK), polyamide-imide (PAI), or polysulfone (PSU), which has long-term thermal stability at 230° C. or more and short-term thermal stability at 400° C. or more, maintains high strength, elasticity and rigidity even at heat deflection temperature (HDT/A) of 470° C. or more or temperature of 230° C. or more, has cold resistance −40° C. or less, exhibits high purity and emits low-temperature gases in a vacuum state, and has high processability and flame retardancy.

The heating layer 6000 may include the plurality of heating elements 6100 spaced apart from each other, the plurality of heating elements 6100 may be arranged in rows and columns, similar to the plurality of electrodes 4100 included in the upper electrode plate 4000, and both ends of each of the plurality of heating elements 6100 are respectively connected to a pair of electrodes 4100 spaced apart from each other of the upper electrode plate 4000 through the perforated holes 5100 of the insulating film 5000 as described above.

The heating elements 6100 may be formed by printing and drying a heating-element composition containing a mixed binder and conductive particles, and may have a thickness of about 3 to 20 m.

The mixed binder may contain two or more materials selected from the group consisting of a phenol-based resin, an acetal resin, an isocyanate resin, an epoxy resin, etc. to have heat resistance even at a temperature of about 300° C., and the conductive particles may contain carbon particles to improve the heat resistance of the heating elements 410 and additionally contain metal powder.

The carbon particles may include carbon black, carbon nanotubes, graphite, activate carbon, or the like, and preferably, carbon nanotubes and graphite, carbon nanotubes, which are carbon particles, have a large aspect ratio and may form a sufficient electrical network when a small amount thereof is used and increase glass transition temperature and heat resistance of the heating element composition, and graphite may allow to achieve low resistance that cannot be achieved using carbon nanotubes.

The protective film 7000 may be additionally stacked on the heating layer 6000 to protect the heating layer 6000 from the outside and have a shape corresponding to a whole shape of the heating layer 6000 and a thickness of about 10 to 100 m. In addition, the upper protective film 7000 may be formed of the same material as or a different material from the material of the lower protective film 1000 or the insulating film 5000, and preferably, the same material.

The serial and curved type planar heat-generating heater of the present invention may be manufactured by sequentially performing the following operations (a) to (f):

a) forming the pair of protruding electrodes 2200*a* and 2200*b* to be electrically disconnected from each other by forming the separation line 2300 by etching the lower electrode plate 2000 stacked on the lower protective film 1000 by photolithography, b) laminating on the lower electrode plate 2000 the base substrate 3000 with the via holes 3100 filled with a conductive material, c) forming the plurality of electrodes 4100 to be spaced apart from each other by forming a plurality of gaps 4200 by etching the upper electrode plate 4000 by photolithography, and laminating the plurality of electrodes 4100 on the base substrate 3000, d) laminating on the upper electrode plate 4000 the insulating film 4000 with the plurality of perforated holes 5100 formed by etching using a laser device, e) connecting a pair of perforated holes 5100 on surfaces of a pair of adjacent electrodes among the plurality of perforated holes 310 to print the plurality of heating elements 61000 having both ends respectively connected to the pair of electrodes and spaced apart from each other, and f) laminating the upper protective film 7000 on the heating layer 6100 including the heating elements 6100.

In the serial and curved type planar heat-generating heater of the present invention, dead zones may be minimized owing to the above structure, and particularly, a structure in which the insulating film 5000 is stacked on the upper electrode plate 4000 including the plurality of electrodes 4100 spaced apart from each other and all of the plurality of electrodes 4100 are electrically connected through the plurality of heating elements 6100 each having both ends connected to a pair of adjacent electrodes 4000 through the plurality of perforated holes 5100 of the insulating film 5000, thereby connecting the plurality of heating elements 6100 in series, unlike in the related art in which a plurality of heating elements 6100 are connected in parallel and thus design of an electrode pattern for connecting electrodes having different polarities to both ends of each heating element 6100 is complicated, thereby increasing dead zones in which a heating element is not disposed on heat-generating surfaces and thus heat is not generated; and high temperature uniformity may be achieved through rapid heat transfer in all of heat-generating surfaces of the planar heat-generating heater by covering all of the heat-generating surfaces of the planar heat-generating heater with electrodes formed of a metal having high thermal conductivity.

Figure 17:
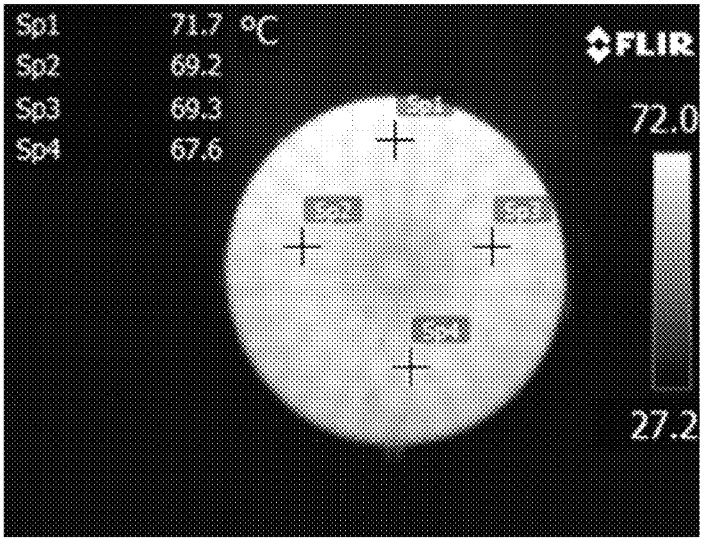
FIG. 17 is a photograph of a thermal image when the serial and curved type planar heat-generating heater of FIG. 8 generates heat.
Figure 18:
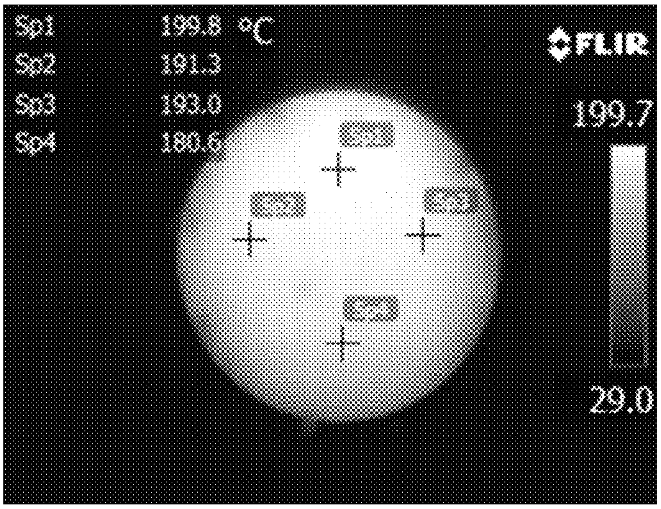
FIG. 18 is a photograph of another thermal image when the serial and curved type planar heat-generating heater of FIG. 8 generates heat.

FIGS. 17 and 18 are photographs of examples of a thermal image when the serial and curved type planar heat-generating heater of FIG. 8 generates heat.

Specifically, FIG. 17 is a photograph of a thermal image when heat is generated by a curved planar heat-generating heater configured to generate low-temperature heat. FIG. 18 is a photograph of a thermal image when heat is generated by a curved planar heat-generating heater configured to generate high-temperature heat.

As shown in FIGS. 17 and 18, in a serial and curved type planar heat-generating heater according to the present invention, high temperature uniformity may be achieved through rapid heat transfer by covering all of heat-generating surfaces with the upper electrode plate 4000 having high thermal conductivity and through design of shapes of electrodes and heating elements for minimizing dead zones.

Furthermore, as described above, in the curved planar heat-generating heater, heating performance is controllable by designing the perforated holes 5100 on the insulating film 5000 stacked on the upper electrode plate 4000 rather than designing the upper electrode plate 4000 and thus design for control of heating performance may be easier than that of a planar heat-generating heater of the related art in which design of an electrode plate should be changed according to heating performance.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

What is claimed is:

1. A serial type planar heat-generating heater comprising a base substrate, an electrode plate, an insulating film, and a heating layer that are sequentially stacked from bottom to top, wherein the electrode plate comprises a plurality of electrodes spaced apart from each other, a plurality of perforated lines are formed in the insulating film to extend to surfaces of the plurality of electrodes, the heating layer comprises a plurality of heating elements spaced apart from each other, and both ends of each of the plurality of heating elements are respectively connected to a pair of adjacent electrodes through the perforated lines, thereby connecting all of the plurality of heating elements in series to each other.

2. The serial type planar heat-generating heater of claim 1, wherein the perforated lines are formed such that widths thereof that are in parallel to a direction in which current flows through the heating elements are the same with respect to all of certain points on each of the heating elements.

3. The serial type planar heat-generating heater of claim 1, wherein the plurality of electrodes and the plurality of heating elements are arranged in rows or columns, and the plurality of electrodes comprise an electrode located at one end of adjacent rows or columns and having a shape includable in both the adjacent rows or columns.

4. The serial type planar heat-generating heater of claim 1, wherein a protective film is stacked on the heating layer.

5. A manufacturing method of the serial type planar heat-generating heater of claim 4, comprising:

a) forming a plurality of electrodes to be spaced apart from each other by forming a plurality of gaps on the electrode plate stacked on the base substrate;

b) laminating an insulating film with a plurality of perforated lines on the electrode plate;

c) connecting a pair of perforated lines located on surfaces of a pair of adjacent electrodes among the plurality of perforated lines to print a plurality of heating elements spaced apart from each other and having both ends respectively connected to the pair of electrodes, and d) laminating a protective film on the heating elements, wherein operations a) to d) are performed sequentially.

6. The serial type planar heat-generating heater of claim 1, further comprising a lower electrode plate below the base substrate, and a lower substrate stacked below the lower electrode plate, wherein the base substrate comprises a via hole filled with a conductive material, an electrode located at an end among the plurality of electrodes electrically connected through the heating elements is connected to the lower electrode plate through the via hole, and the lower electrode plate comprises a protruding electrode located adjacent to an electrode located at another end among the plurality of electrodes.

7. The serial type planar heat-generating heater of claim 6, wherein the base substrate comprises a plurality of via holes filled with a conductive material, a pair of electrode located at opposite ends among the plurality of electrodes electrically connected through the heating elements are connected to the lower electrode plate through the via holes, and the lower electrode plate comprises a pair of protruding electrodes respectively connected to the pair of electrodes located at the opposite ends, disposed apart from each other, and electrically disconnected from each other by a separation line.

8. The serial type planar heat-generating heater of claim 1, wherein the electrode is formed of a metal having a specific resistance of $2.82\times10^{-6}$ Ω·cm or less, a heat resistance of 260° C. or more, and thermal conductivity of 12 W/m.K.

9. The serial type planar heat-generating heater of claim 1, wherein the insulating film comprises an insulating film containing at least one polymer resin selected from the group consisting of polyimide (PI), polyphenylene sulfide (PPS), a liquid crystal polymer (LCP), polyethyelene sulfide (PES), polyethyelene imide (PEI), polyether ether ketone (PEEK), polyamide-imide (PAI), and polysulfone (PSU).

10. The serial type planar heat-generating heater of claim 1, wherein the heating elements are formed of a heating element composition containing a mixed binder and conductive particles, wherein the conductive particles comprise at least one of metal particles and carbon particles.

* * * * *